(12) United States Patent
Geva et al.

(10) Patent No.: US 7,975,263 B2
(45) Date of Patent: Jul. 5, 2011

(54) METHOD AND APPARATUS FOR GENERATING RUN TIME PROFILES FOR PROGRAM COMPILATION

(75) Inventors: Robert Geva, Cupertino, CA (US); Jinpyo Kim, St. Paul, MN (US)

(73) Assignee: Intel Corporation, Santa Clara, CA (US)

( * ) Notice: Subject to any disclaimer, the term of this patent is extended or adjusted under 35 U.S.C. 154(b) by 1403 days.

(21) Appl. No.: 11/328,701

(22) Filed: Jan. 10, 2006

(65) Prior Publication Data

US 2007/0162896 A1    Jul. 12, 2007

(51) Int. Cl.
  *G06F 9/44* (2006.01)
  *G06F 9/45* (2006.01)
(52) U.S. Cl. ........ 717/130; 717/134; 717/135; 717/140; 717/158
(58) Field of Classification Search .......... None
  See application file for complete search history.

(56) References Cited

U.S. PATENT DOCUMENTS

| | | | | |
|---|---|---|---|---|
| 4,937,765 | A * | 6/1990 | Shupe et al. ................. | 702/187 |
| 5,717,393 | A * | 2/1998 | Nakano et al. ................. | 341/50 |
| 5,796,939 | A * | 8/1998 | Berc et al. ..................... | 714/47 |
| 5,815,720 | A * | 9/1998 | Buzbee ........................ | 717/158 |
| 6,070,009 | A * | 5/2000 | Dean et al. .................... | 717/130 |
| 6,163,840 | A * | 12/2000 | Chrysos et al. ............... | 712/227 |
| 6,195,748 | B1 * | 2/2001 | Chrysos et al. ............... | 712/227 |
| 6,202,205 | B1 * | 3/2001 | Saboff et al. ................. | 717/151 |
| 6,631,518 | B1 * | 10/2003 | Bortnikov et al. ............ | 717/158 |
| 6,760,907 | B2 * | 7/2004 | Shaylor ....................... | 717/158 |
| 7,587,709 | B2 * | 9/2009 | Chilimbi et al. .............. | 717/130 |
| 7,739,662 | B2 * | 6/2010 | Bouguet et al. ............... | 717/124 |
| 7,747,988 | B2 * | 6/2010 | Zhu et al. ..................... | 717/131 |
| 2002/0099714 | A1 * | 7/2002 | Murray ........................ | 707/100 |
| 2004/0010785 | A1 * | 1/2004 | Chauvel et al. ............... | 717/158 |
| 2004/0216082 | A1 * | 10/2004 | Sun ............................... | 717/100 |
| 2005/0251325 | A1 * | 11/2005 | Kudo et al. ................... | 701/200 |

OTHER PUBLICATIONS

McEliece, The Theory of Information and Coding, Cambridge University Press, 2004, p. 17.*
Carter, An Introduction to Information Theory and Entropy, Complex Systems Summer School, California State University Stanislaus, Jun. 2003, pp. 1-126, accessed Mar. 4, 2010 <http://astarte.csustan.edu/~tom/SFI-CSSS/2003/info-lec.pdf>.*
Das et al., Performance of Runtime Optimization on BLAST, Computer Science and Engineering Technical Report 04-038, University of Minnesota, Oct. 15, 2004, pp. 1-25, accessed Mar. 4, 2010 <http://www.cs.umn.edu/tech_reports_upload/tr2004/04-038.pdf>.*
Li et al., Entropy-Based Criterion in Categorical Clustering, Proceedings of the 21st International Conference on Machine Learning, Jul. 2004, pp. 68-75, accessed Mar. 9, 2010 <http://doi.acm.org/10.1145/1015330.1015404>.*
Zhang et al., System Support for Automatic Profiling and Optimization, SIGOPS Operating Systems Review, Dec. 1997, pp. 15-26, accessed Mar. 3, 2010 <http://doi.acm.org/10.1145/269005.266640>.*

(Continued)

*Primary Examiner* — Thuy Dao
(74) *Attorney, Agent, or Firm* — L. Cho

(57) ABSTRACT

A method for managing a profile includes generating an initial profile of code using an initial sampling frequency. An information entropy value of the profile is computed. A representative profile of the code is determined from additional profiles using a sampling frequency determined from the information entropy value. Other embodiments are disclosed and claimed.

25 Claims, 7 Drawing Sheets

OTHER PUBLICATIONS

"Estimation of rare event probabilities using cross-entropy", Homem-de-mello et al., Dec. 2002, pp. 310-319, <http://delivery.acm.org/10.1145/1040000/1030499/p310-homem-de-mello.pdf>.*

"Using perfect sampling in parameter estimation of a whole sentence maximum entropy language model", Amaya et al., Sep. 2000, pp. 79-82, <http://delivery.acm.org/10.1145/1120000/1117618/p79-amaya.pdf>.*

"Entropy-Based Profile Characterization and Classification for Automatic Profile Management", Kim et al., 2007, pp. 40-51, <http://dynopt.dtc.umn.edu/papers/kim-acsac-2007.pdf>.*

* cited by examiner

METHOD AND APPARATUS FOR GENERATING RUN TIME PROFILES FOR PROGRAM COMPILATION

FIELD

An embodiment of the present invention pertains to run time environments. More specifically, an embodiment of the present invention relates to a method and apparatus for generating run time profiles for program compilation.

BACKGROUND

The need for increased portability of software programs has resulted in increased development and usage of runtime environments. The term portability refers to the ability to execute a given software program on a variety of computer platforms having different hardware and operating systems. The term "runtime environment" may be referred to as runtime system or virtual machine. The runtime environment allows software programs in source code format to be executed by a target execution platform (i.e., the hardware and operating system of a computer system) in a platform-independent manner. Source code instructions are not statically compiled and linked directly into native or machine code for execution by the target execution platform. Instead, the instructions are statically compiled into an intermediate language (e.g., byte-code) and the intermediate language may then be interpreted or subsequently compiled by a just-in-time (JIT) compiler within the runtime environment into native or machine code that can be executed by the target execution platform.

When compiling intermediate language code, it would be desirable to utilize information obtained from a previous execution of the code to determine how to best optimize the present compilation. A profile of how the code executes may be generated from information sampled from performance counters in a processor executing the code. Determining an appropriate sampling frequency, however, may be challenging. A sampling frequency that is set too high may adversely impact the execution of the code due to the overhead associated with sampling the performance counters. On the other hand, a sampling frequency that is set too low would yield information that is less accurate and less reliable.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

Figure 1:
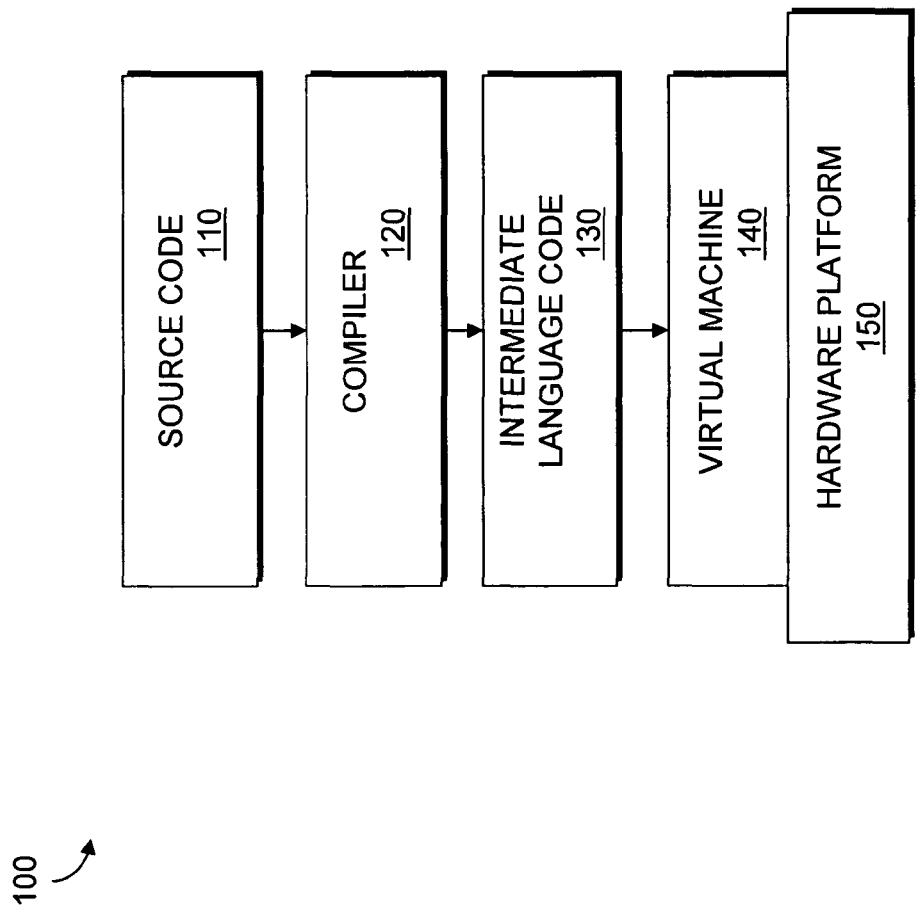
FIG. 1 is a block diagram of a software compilation and execution system according to an example embodiment of the present invention.

FIG. 1 illustrates a software program compilation and execution system 100 according to embodiment of the present invention. The software program compilation and execution system 100 includes a compiler 120 that compiles source code 110 into an intermediate language code 130. The source code 110 may be, for example, JAVA byte-code or Common Intermediate Language (CIL) code. According to an embodiment of the present invention, the compiler 120 is a software system that is run on a computer system and the intermediate language code 130 is stored in a memory of the computer system.

The software program compilation and execution system 100 includes a virtual machine 140 and a hardware platform 150. The virtual machine 140 further compiles the intermediate language code 130 into native code. According to an embodiment of the present invention, native code is machine code that is particular to a specific architecture or platform. The virtual machine 140 may be implemented as a software system. In this embodiment, the virtual machine 140 runs on the hardware platform 150. The virtual machine 140 may be, for example, a JAVA virtual machine, a small talk runtime system, or other runtime system. Alternatively, the virtual machine 140 may be implemented using other techniques (e.g., as a firmware system).

The hardware platform 150 executes the native code compiled by the virtual machine 140. The hardware platform 150 may be implemented, for example, by a personal computer, a personal digital assistant, a network computer, a server computer, a notebook computer, a workstation, a mainframe computer, or a supercomputer. Alternatively, the hardware platform 150 may be implemented by any other electronic system with data processing capabilities. The intermediate language code 130 may be delivered to the hardware platform 150 via a communication link such as a local area network, the Internet, or a wireless communication network.

Figure 2:
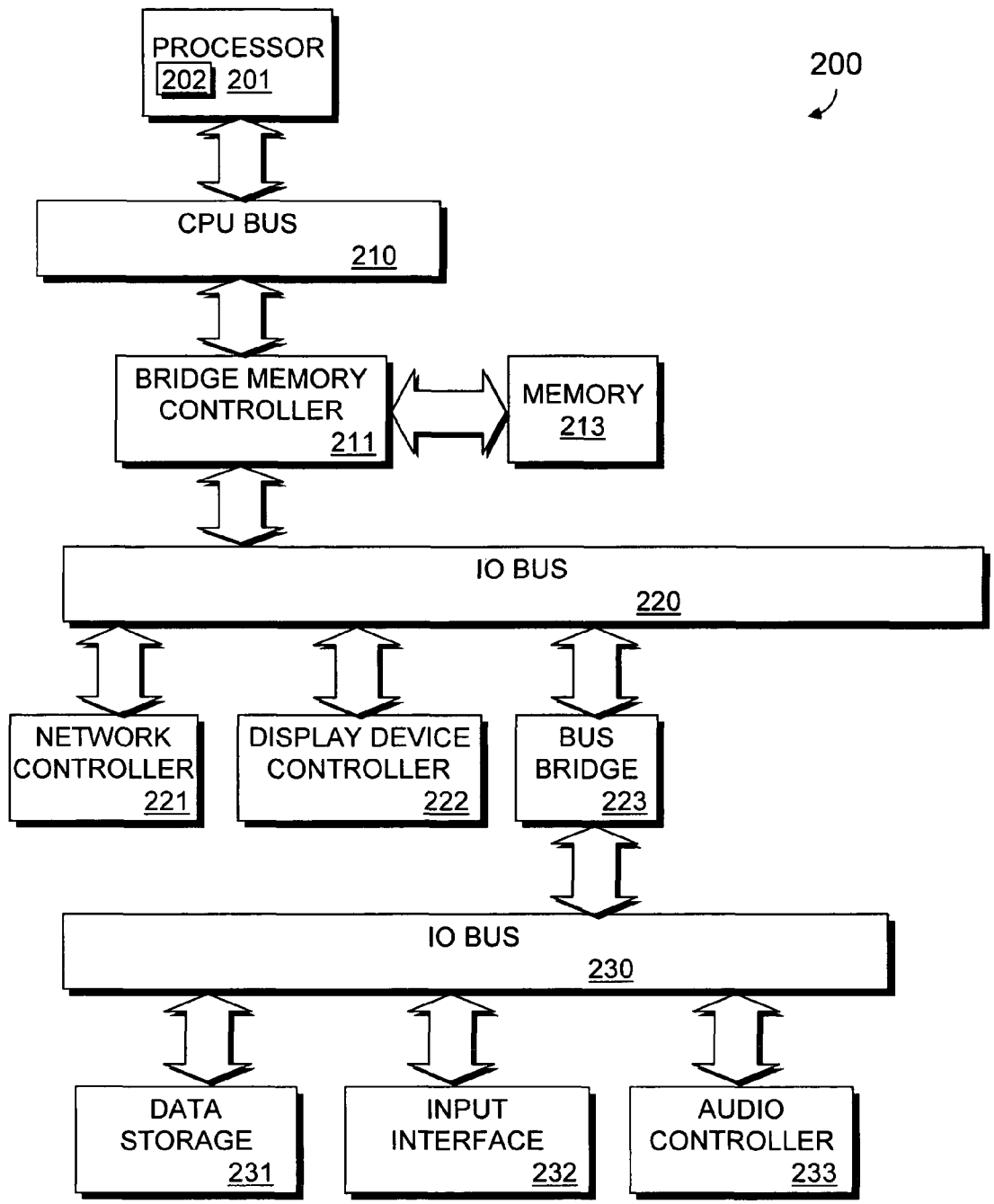
FIG. 2 is a block diagram of a hardware platform according to an example embodiment of the present invention.

FIG. 2 is a block diagram of an exemplary computer system 200 according to an embodiment of the present invention. The computer system 200 may be used to implement the hardware platform 150 shown in FIG. 1. The computer system 200 includes a processor 201. The processor 201 may be a complex instruction set computer microprocessor, a reduced instruction set computing microprocessor, a very long instruction word microprocessor, a processor implementing a combination of instruction sets, or other processor device. FIG. 2 shows the computer system 200 with a single processor. However, it is understood that the computer system 200 may operate with multiple processors or multi-core processors. The processor 201 is coupled to a CPU bus 210 that transmits data signals between processor 201 and other components in the computer system 200. According to an embodiment of the computer system 200, the processor 201 includes one or more performance counters 202. The performance counters 202 may operate to count events associated with the execution of code. For example, the performance counters 202 may count instructions that are retired, cycles that are retired, data cache misses, instruction cache misses, branch mis-predictions, and other events.

The computer system 200 includes a memory 213. The memory 213 may be a dynamic random access memory device, a static random access memory device, read only memory, and/or other memory device. The memory 213 may store instructions and code represented by data signals that may be executed by the processor 201. A cache memory resides inside processor 201 that stores data signals stored in memory 213. The cache speeds up memory accesses by the processor 201 by taking advantage of its locality of access. In an alternate embodiment of the computer system 200, the cache resides external to the processor 201.

A bridge memory controller 211 is coupled to the CPU bus 210 and the memory 213. The bridge memory controller 211 directs data signals between the processor 201, the memory 213, and other components in the computer system 200 and bridges the data signals between the CPU bus 210, the memory 213, and a first input output (IO) bus 220.

The first IO bus 220 may be a single bus or a combination of multiple buses. The first IO bus 220 provides communication links between components in the computer system 200. A network controller 221 is coupled to the first IO bus 220. The network controller 221 may link the computer system 200 to a network of computers (not shown) and supports communication among the machines. A display device controller 222 is coupled to the first IO bus 220. The display device controller 222 allows coupling of a display device (not shown) to the computer system 200 and acts as an interface between the display device and the computer system 200.

A second IO bus 230 may be a single bus or a combination of multiple buses. The second IO bus 230 provides communication links between components in the computer system 200. A data storage device 231 is coupled to the second IO bus 230. The data storage device 231 may be a hard disk drive, a floppy disk drive, a CD-ROM device, a flash memory device or other mass storage device. An input interface 232 is coupled to the second IO bus 230. The input interface 232 may be, for example, a keyboard and/or mouse controller or other input interface. The input interface 232 may be a dedicated device or can reside in another device such as a bus controller or other controller. The input interface 232 allows coupling of an input device to the computer system 200 and transmits data signals from an input device to the computer system 200. An audio controller 233 is coupled to the second 10 bus 230. The audio controller 233 operates to coordinate the recording and playing of sounds and is also coupled to the IO bus 230. A bus bridge 223 couples the first 10 bus 220 to the second 10 bus 230. The bus bridge 223 operates to buffer and bridge data signals between the first IO bus 220 and the second 10 bus 230.

Figure 3:
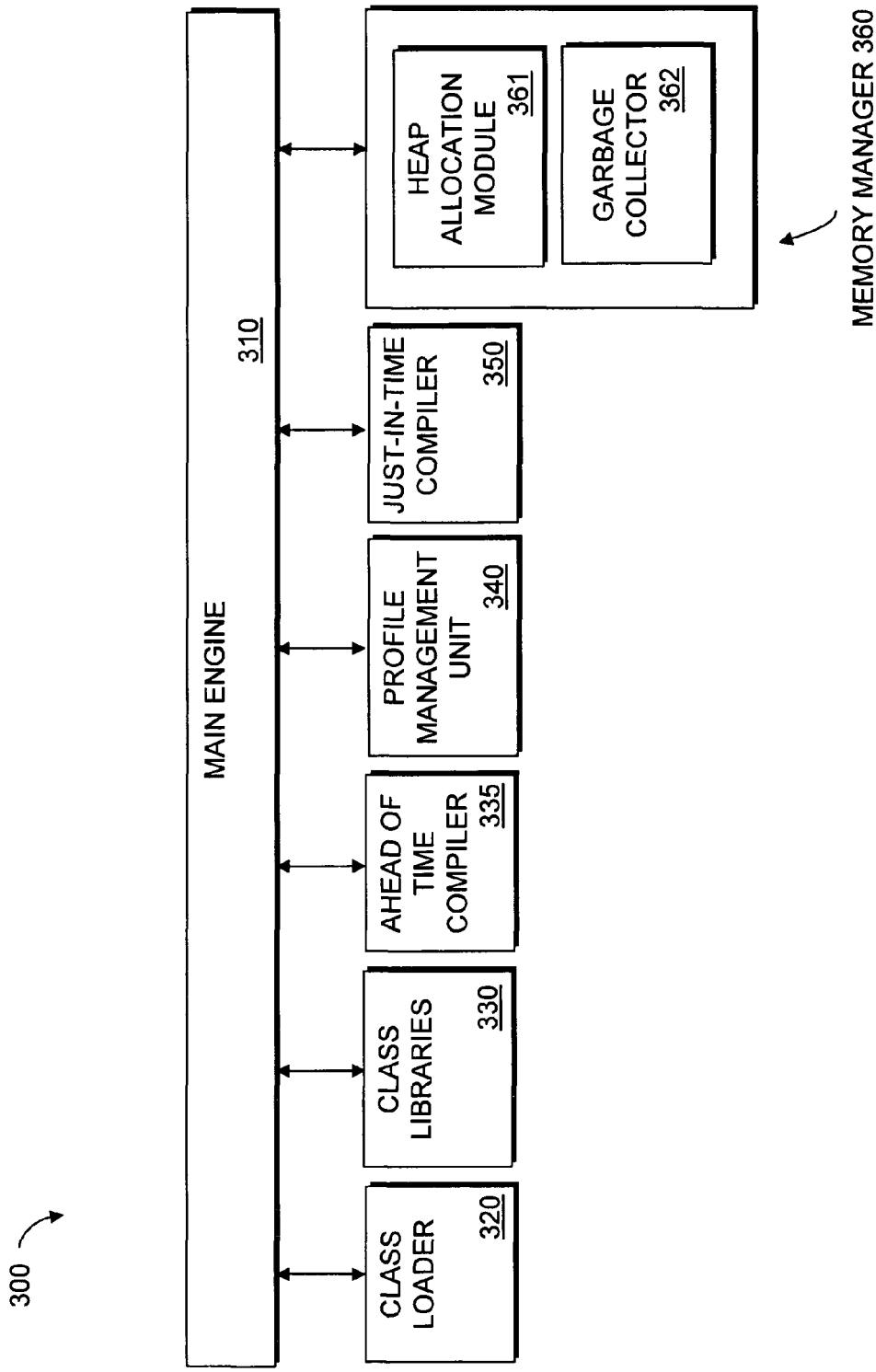
FIG. 3 is a block diagram of a virtual machine according to an example embodiment of the present invention.

FIG. 3 is a block diagram of a virtual machine 300 according to an embodiment of the present invention. The virtual machine 300 may be implemented as the virtual machine 140 shown in FIG. 1. The virtual machine 300 includes a main engine 310. The main engine 310 may be employed as the main core of the virtual machine 300. The main engine 310 monitors compilation and execution of the intermediate language code, and coordinates use of other modules in the virtual machine 300 when required.

The virtual machine 300 includes a class loader 320. The class loader 320 may be used to load classes. The class loader 320 may also perform other functions associated with loading classes. For example, the class loader 320 may also verify loaded classes.

The virtual machine 300 includes class libraries 330. The class libraries 330 may be used to store shared classes when a program may include more than one type of class, (i.e., application-specific class and shared class).

According to an embodiment of the present invention, the virtual machine 300 may include an ahead of time compiler 335 (pre-just-in-time-compiler). The ahead of time compiler 335 may be invoked at program installation time and translate the program from the intermediate language form in which it was distributed into a machine specific executable code. The ahead of time compiler may also be invoked post installation, to recompile a program while it is not executing.

The virtual machine includes a profile management unit 340. The profile management unit 340 determines a sampling frequency in which to sample performance counters in a processor. The sampling frequency chosen allows the profile management unit 340 to collect information to generate an accurate representative profile of the code without adversely affecting execution of the code. Optimizations may be made in the code in response to the representative profile. According to an embodiment of the present invention, the optimizations may be made by the ahead of time compiler 335, profile management unit 340, the just-in-time compiler 350, and/or another component.

The virtual machine 300 includes the just-in-time compiler 350. The just-in-time compiler 350 may compile intermediate language code to generate native or machine code at runtime that is executed by a hardware platform. According to an embodiment of the present invention, "just-in-time" refers to the just-in-time compiler 350 compiling or translating each method or class when it is used for execution into native code.

The virtual machine 300 includes a memory manager 360. The memory manager 360 may be used to manage a specific memory space within the memory referred to as heap or heap space. The memory manager 360 includes a heap allocation module 361 and a garbage collector 362. The heap allocation module 361 may be used to allocate objects from the heap space in the memory. The garbage collector 362 may be used to reclaim memory space in the heap used by objects that are no longer referenced by an application or method. Additionally, the garbage collector 362 also may move objects to reduce heap fragmentation. The memory manager 360 interacts with the main engine 310 and the just-in-time compiler 340.

The main engine 310, class loader 320, class libraries 330, ahead of time compiler 335, profile management unit 340, just-in-time compiler 350, and memory manager 360 may be implemented using any known technique or circuitry. It should be appreciated that other components may also be implemented in the virtual machine 300.

Figure 4:
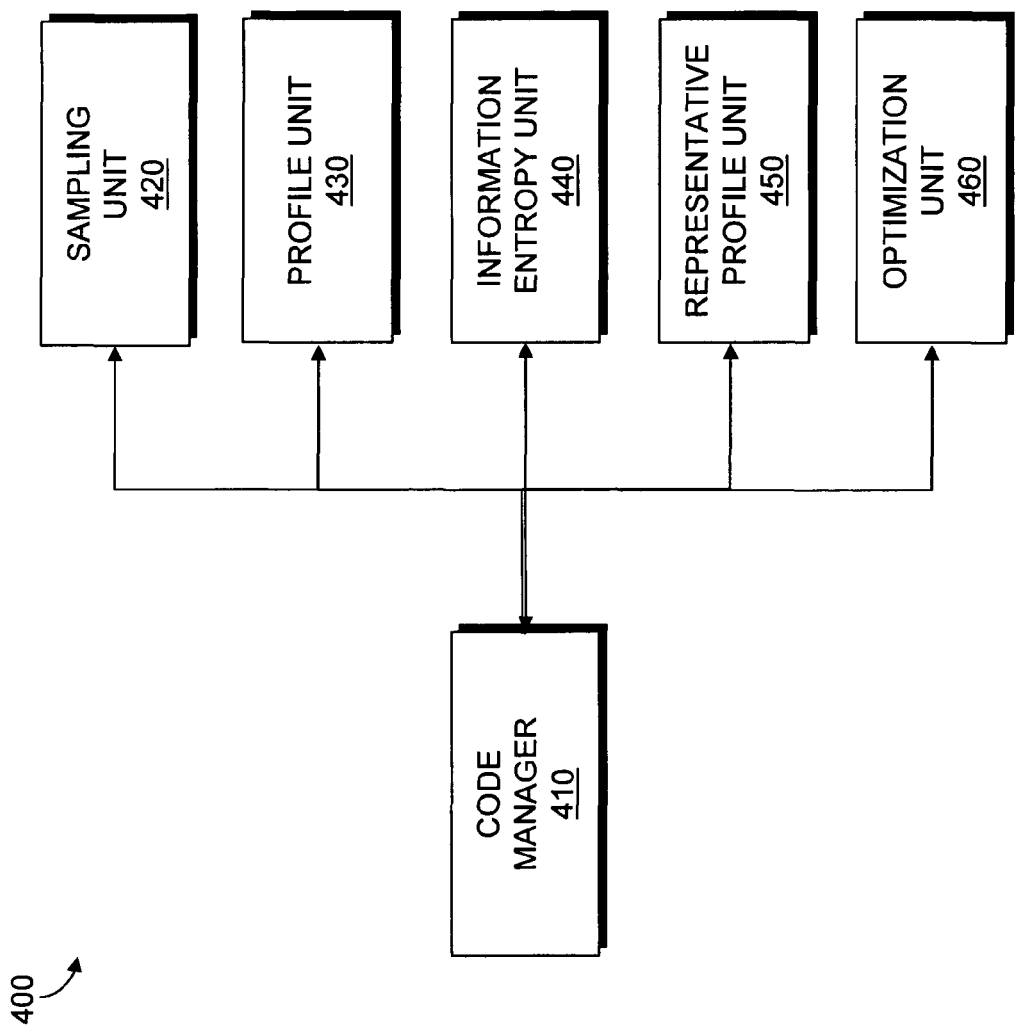
FIG. 4 is a block diagram of a profile management unit according to an example embodiment of the present invention.

FIG. 4 is a block diagram of a profile management unit 400 according to an embodiment of the present invention. The profile management unit 400 may be used to implement the profile management unit 340 shown in FIG. 3. The profile management unit 400 includes a code manager 410. The code manager 410 manages the operation of the components in the profile management unit 400 and transmits information between the components in the profile management unit 400.

The profile management unit 400 includes a sampling unit 420. The sampling unit 420 samples performance counters in a processor that count events associated with the execution of code. According to an embodiment of the profile management unit 400, the sampling unit 420 may be programmed by the code manager 410 to sample specified performance counters with specified sampling frequencies (sample after values). After the occurrence of the sample after value, a task may be performed by the sampling unit 420. For example, the sampling unit 420 may be programmed with a sampling frequency of 10,000 for a performance counter that counts instructions that have retired. After 10,000 instructions have been retired, the sampling unit 420 may generate an interrupt and record an instruction pointer.

The profile management unit 400 includes a profile unit 430. The profile unit 430 creates a profile of an executed program with information generated by the sampling unit 420. The profile of the executed program may identify places in the code that exhibit certain characteristics such as those that may be problematic or undesirable. For example, the profile unit 430 may generate a profile of the executed program that identifies specific lines of code that result in retired instructions, retired cycles, data cache misses, instruction cache misses, and branch mis-predictions. It should be appreciated that the profile may also or alternatively identify other events.

The profile management unit 400 includes an information entropy unit 440. The information entropy unit 440 generates an information entropy value of the profile created by the profile unit 440. The information entropy unit 440 uses the information entropy value to determine one or more sampling frequencies for the sampling unit 420 to use for future sampling of the program.

The information entropy unit 440 generates the information entropy value by using the relationship shown below.

$$\sum_{i=0}^{N} P(i) * \log(1/P(i))$$

In the above relationship, P(i) represents values from the initial profile. According to one embodiment, P(i) represents the number of samples in the $i^{th}$ code address divided by the overall number of samples, and N is the number of observations. The information entropy unit 440 may then identify an appropriate sampling frequency to be used in subsequent executions of the same program. According to an embodiment of the profile management unit 400, information entropy values in the range of 0 to 5 may be characterized as low and be assigned a low sampling frequency. Information entropy values in the range of greater than 5 to 8 may be characterized as medium and be assigned a medium sampling frequency. Information entropy values in the range of greater than 8 may be characterized as high and be assigned a high sampling frequency. According to an embodiment of the present invention, the profile management unit 400 utilizes the observation that a direct correlation exists between the information entropy of the profile and a convergence rate of a representative profile that is generated from one or more profiles viewed cumulatively. The first profile of the program forms a statistical distribution where each sampled event has a probability that is the number of its occurrences divided by the overall number of sample.

Figure 5A:
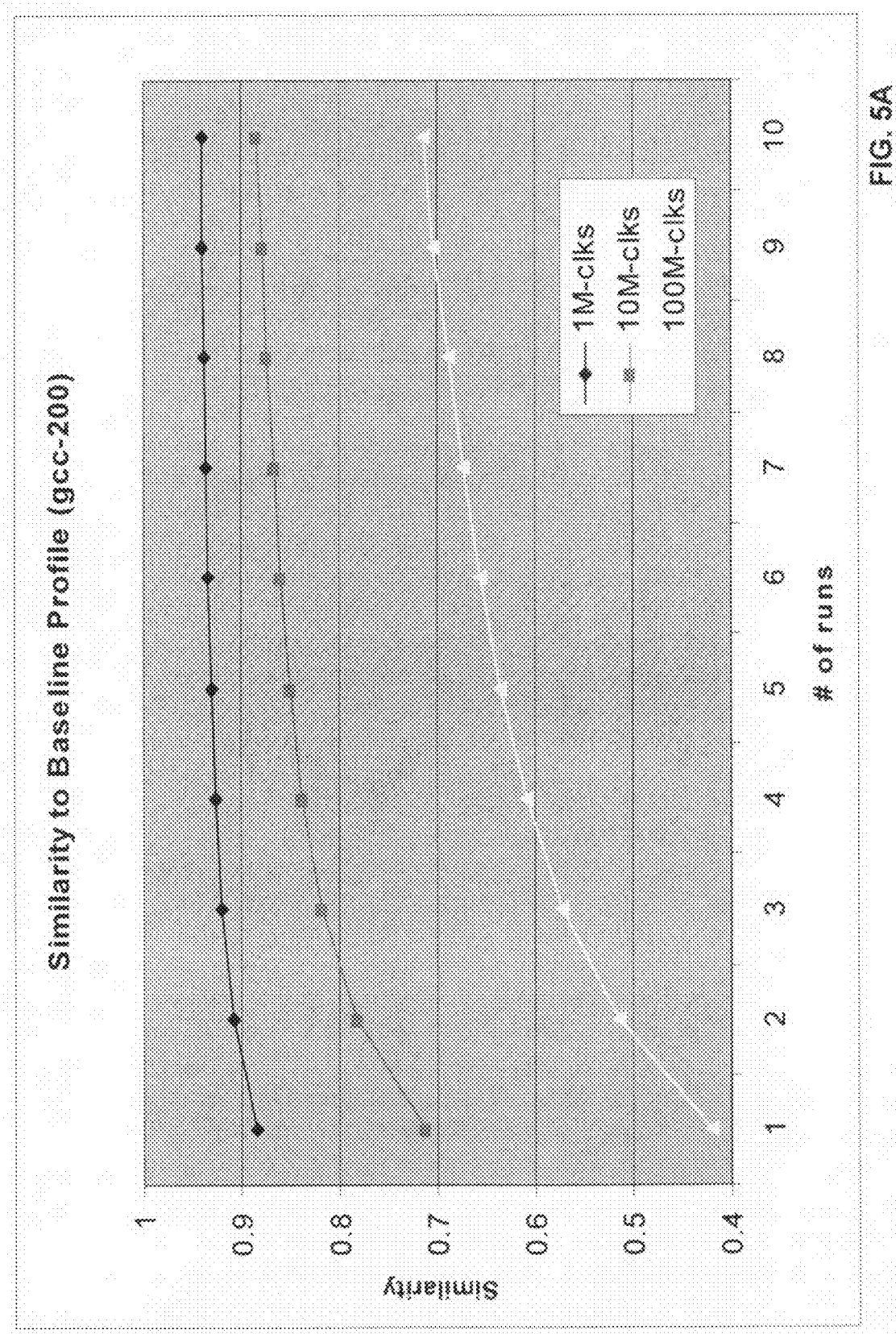
FIGS. 5A and 5B illustrate a plurality of exemplary profiles converging to an exemplary representative profile.
Figure 5B:
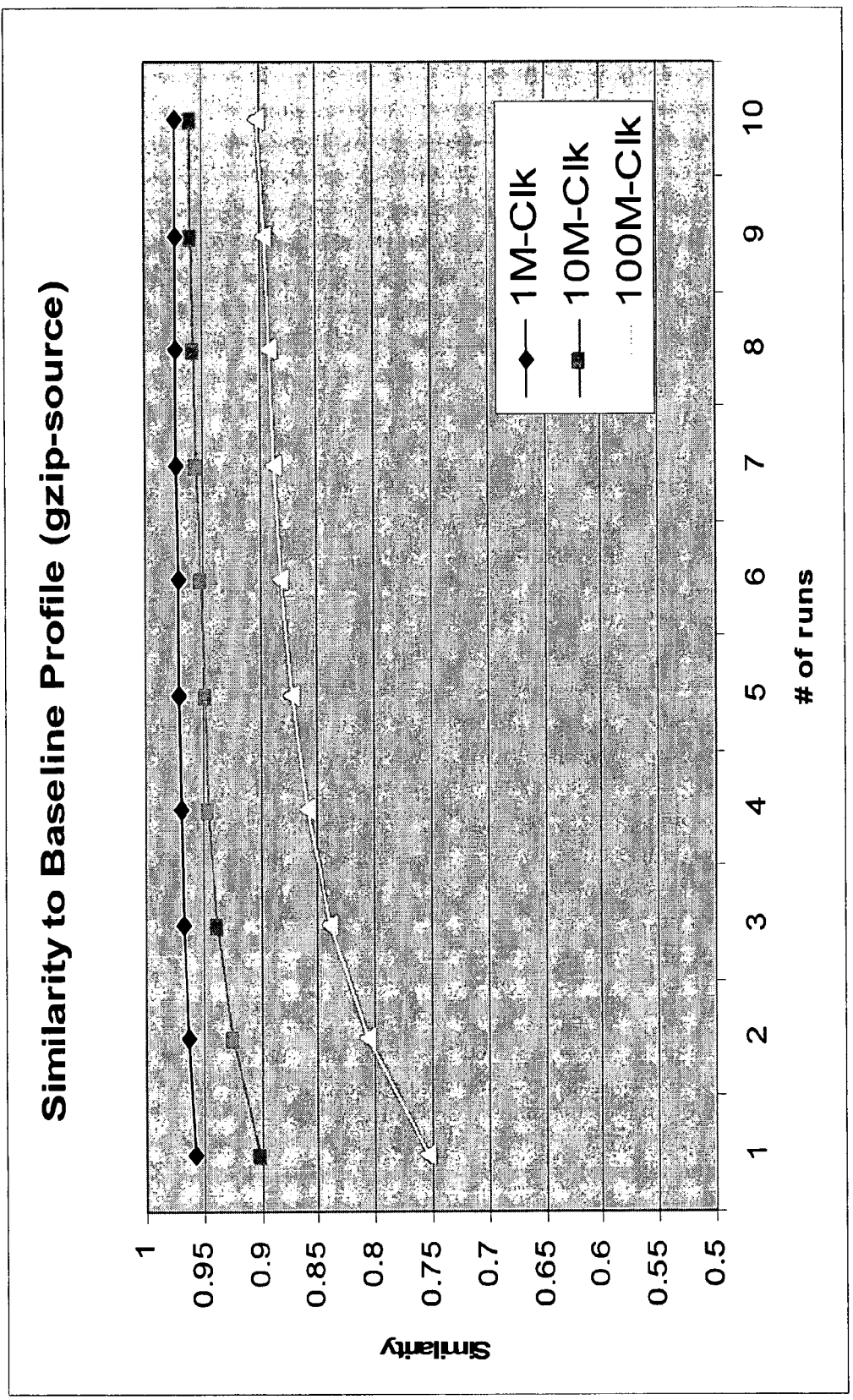

FIGS. 5A and 5B are charts that illustrate a plurality of exemplary profiles converging to an exemplary representative profile for two benchmarks. The benchmarks are 146.gzip and 176.gcc. The horizontal axes on the charts show the number of times that a benchmark is profiled and the number of times the profiles are combined, and the vertical axes show the measure of distance from the real profile, which is represented by the value of 1. The charts illustrate that in both cases, the profiles start at some distance from the real profiles, but that they converge as additional profiles are combined. For each benchmark, three curves are shown, each representing three different sampling frequencies. The charts also show that the profiles for 164.gzip start at a closer distance to the real profile and converge faster, whereas the profiles for 176.gcc start at a greater distance and converge after additional profiles are added. It should be noted that the profiles of 176.gcc have higher entropy than those of 164.gzip. The benchmarks used as shown are taken from the Standard Performance Evaluation Corporation. It should be appreciated that other benchmarks may also be used.

Referring back to FIG. 4, the profile management unit 400 includes a representative profile unit 450. The representative profile unit 450 generates a representative profile from two or more profiles generated from the profile unit 430. According to an embodiment of the profile management unit 400, the representative profile unit 450 averages the information in the profiles generated from the profile unit 430 to generate the representative profile.

The profile management unit 400 includes an optimization unit 460. The optimization unit 460 optimizes the code in response to information in the representative profile. According to an embodiment of the present invention, the optimization may involve recompiling the code off-line using a low priority compilation process. According to an alternate embodiment of the present invention, optimizations may be forwarded to a just-in-time compiler for compilation during program execution. It should be appreciated that other techniques and procedures may be implemented to optimize the code using the information from the representative profile. It should also be appreciated that the optimization unit 460 may reside outside the profile management unit 400 and reside in a component such as an ahead of time compiler.

According to an embodiment of the profile management unit 400, an initial profile is generated for code using information sampled by the sampling unit 420 at an initial sampling frequency. The initial sampling frequency may be a low sampling frequency. The information entropy unit 440 may generate an information entropy value for the initial profile and identify a sampling frequency to use for subsequent sampling of the code using the information entropy value. The sampling unit 420 samples the code using the sampling frequency identified by the information entropy unit 440 and the profile unit 430 generates additional profiles for the code. The representative profile unit 450 creates a representative profile for the code using the additional profiles and the optimization unit 460 optimizes the code using the information from the representative profile.

Figure 6:
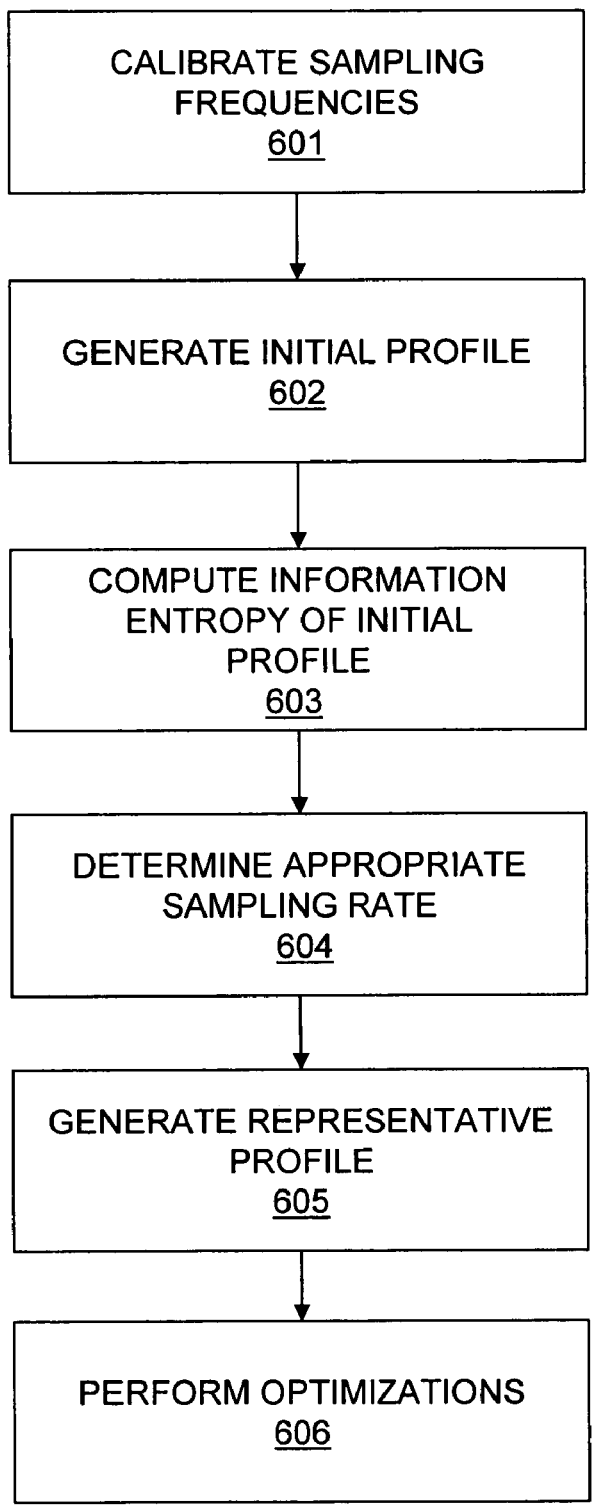
FIG. 6 is a flowchart illustrating a method for managing code according to an example embodiment of the present invention.

FIG. 6 is a flowchart illustrating a method for managing code according to an embodiment of the present invention. At 601, sampling frequencies are calibrated. According to an embodiment of the present invention, sampling frequencies may be calibrated for association with information entropy values of profiles for the code as executed on a processor. The sampling frequencies may be selected based upon the properties of the processor executing the code such as its frequency and performance level. For example, a high sampling frequency may be 1 million instructions, a medium sampling frequency may be 10 million instructions, and a low sampling frequency may be 100 million instructions.

At 602, an initial profile of the code is generated. The initial profile of the code is generated using information sampled at an initial sampling frequency. According to an embodiment of the present invention, the initial sampling frequency may be a low sampling frequency.

At 603, an information entropy value of the initial profile is computed. The information entropy value of the initial profile may be computed using the following relationship.

$$\sum_{i=0}^{N} P(i) * \log(1/P(i)),$$

where P(i) are values from the initial profile.

At 604, an appropriate sampling rate is determined for future sampling of the code. According to an embodiment of the present invention, a sampling frequency associated with the information entropy value is identified. In one embodiment, information entropy values are grouped into ranges and a sampling frequency is assigned to each of these ranges.

At 605, a representative profile is generated. According to an embodiment of the present invention, the code is executed a plurality of times to generate a plurality of additional profiles that are used to generate the representative profile. According to one embodiment, six to ten additional profiles may be used. The representative profile may include an average of the values in the plurality of additional profiles. It should be appreciated that the representative profile may be updated each time the code is executed and additional profile information is available.

At 606, optimizations are performed on the code using information from the representative profile. For example, if an instruction that loads a value from memory to a register is shown to miss the data cache frequently, a prefetch instruction may be inserted ahead of the load instruction to bring the data into the cache on time. For another example, if a conditional branch is shown to execute very frequently and is mispredicted by the branch prediction unit of a processor frequently, the conditional branch may be converted to one or more predicated instructions. It should be appreciated that other techniques and procedures may be implemented to optimize the code using the information from the representative profile.

According to an embodiment of the present invention, the optimizations may involve recompiling the code off-line using a low priority compilation process. According to an alternate embodiment of the present invention, optimizations may be performed during program execution.

According to an embodiment of the present invention, after optimizations are made and the code has been recompiled, control returns to 602 to generate a new representative profile for the newly re-compiled code.

FIG. 6 is a flow chart illustrating a method for managing code according to embodiments of the present invention. Some of the techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method performed using a computer, comprising:
generating an initial profile of code using an initial sampling frequency;
computing an information entropy value of the initial profile; and
generating a representative profile of the code from additional profiles of the code using a sampling frequency determined from the information entropy value.

2. The method of claim 1, wherein generating the initial profile comprises sampling performance counters.

3. The method of claim 1, wherein the initial profile indicates the occurrence of an instruction retired.

4. The method of claim 1, wherein computing the information entropy value of the profile comprises computing $$\sum_{i=0}^{N} P(i) * \log(1/P(i)),$$

where each P(i) includes values from the initial profile, and N is a number of observations.

5. The method of claim 1, wherein generating the representative profile from additional profiles comprises averaging a sum of values from the additional profiles.

6. The method of claim 1, wherein the sampling frequency is determined by:
associating the information entropy value of the initial profile with a category of information entropy levels; and
identifying a sampling frequency associated with the category of information entropy levels.

7. The method of claim 1, wherein each of the additional profiles is created during execution of the code.

8. The method of claim 1, wherein the sampling frequency generates an accurate representative profile.

9. The method of claim 1, further comprising optimizing the code in response to information in the representative profile.

10. The method of claim 1, further comprising:
optimizing the code in response to information in the representative profile;
generating an initial profile of optimized code using the initial frequency;
computing an information entropy value of the initial profile of the optimized code; and
generating a representative profile of the optimized code from additional profiles using a sampling frequency determined from the information entropy value of the initial profile of the optimized code.

11. The method of claim 1, wherein the sampling frequency determined from the information entropy value is used to sample performance counters in a processor.

12. The method of claim 1, wherein generating a representative profile of the code from additional profiles of the code using a sampling frequency determined from the information entropy value, comprises:
  identifying a sampling frequency assigned to a range of information entropy values that includes the information entropy value of the initial profile;
  generating additional profiles of the code using the sampling frequency; and
  generating a representative profile of the code by averaging the values from the additional profiles generated.

13. A non-transitory machine accessible medium including sequences of instructions, the sequences of instructions including instructions which when executed cause the machine to perform:
  generating an initial profile of code using an initial sampling frequency;
  computing an information entropy value of the initial profile; and
  generating a representative profile of the code from additional profiles of the code using a sampling frequency determined from the information entropy value.

14. The non-transitory machine accessible medium of claim 13, wherein computing the information entropy value of the profile comprises computing $$\sum_{i=0}^{N} P(i) * \log(1/P(i)),$$

where each P(i) includes values from the initial profile, and N is a number of observations.

15. The non-transitory machine accessible medium of claim 13, including additional instructions which when executed causes the machine to further perform optimizing the code in response to information in the representative profile.

16. The non-transitory machine accessible medium of claim 13, including additional instructions which when executed causes the machine to further perform:
  optimizing the code in response to information in the representative profile;
  generating an initial profile of optimized code using the initial frequency;
  computing an information entropy value of the initial profile of the optimized code; and
  generating a representative profile of the optimized code from additional profiles using a sampling frequency determined from the information entropy value of the initial profile of the optimized code.

17. The non-transitory machine accessible medium of claim 13, wherein the sampling frequency determined from the information entropy value is used to sample performance counters in a processor.

18. The non-transitory machine accessible medium of claim 13, wherein generating a representative profile of the code from additional profiles of the code using a sampling frequency determined from the information entropy value, comprises:
  identifying a sampling frequency assigned to a range of information entropy values that includes the information entropy value of the initial profile;
  generating additional profiles of the code using the sampling frequency; and
  generating a representative profile of the code by averaging the values from the additional profiles generated.

19. A profile management unit stored in circuitry, comprising:
  a profile unit to generate an initial profile of code;
  an information entropy unit to compute an information entropy value of the initial profile and to identify a sampling frequency using the information entropy value computed; and
  a representative profile unit to compute a representative profile of the code from additional profiles of the code using the sampling frequency.

20. The profile management unit of claim 19, wherein the profile unit generates the initial profile by sampling performance counters in a processor.

21. The profile management unit of claim 19, wherein the information entropy unit computes $$\sum_{i=0}^{N} P(i) * \log(1/P(i)),$$

where each P(i) includes values from the initial profile, and N is a number of observations.

22. The profile management unit of claim 19, wherein the information entropy unit associates the information entropy value of the profile with a category of entropy levels, and identifies the sampling frequency associated with the category of entropy levels.

23. The profile management unit of claim 19, wherein the representative profile unit averages a sum of values from the additional profiles.

24. The profile management unit of claim 19, further comprising an optimization unit to optimize the code in response to information in the representative profile.

25. The profile management unit of claim 19, wherein the sampling frequency determined from the information entropy value is used to sample performance counters in a processor.

\* \* \* \* \*